United States Patent
Wu et al.

(10) Patent No.: US 12,224,867 B2
(45) Date of Patent: Feb. 11, 2025

(54) METHOD AND DEVICE IN NODES USED FOR HARQ FEEDBACK IN WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 369 days.

(21) Appl. No.: 17/732,543

(22) Filed: Apr. 29, 2022

(65) Prior Publication Data
US 2022/0255675 A1  Aug. 11, 2022

Related U.S. Application Data

(63) Continuation of application No. PCT/CN2020/121351, filed on Oct. 16, 2020.

(30) Foreign Application Priority Data

Nov. 9, 2019  (CN) .......................... 201911090976.1

(51) Int. Cl.
*H04W 4/00* (2018.01)
*H04L 1/1812* (2023.01)
*H04W 72/121* (2023.01)

(52) U.S. Cl.
CPC ......... *H04L 1/1812* (2013.01); *H04W 72/121* (2013.01)

(58) Field of Classification Search
CPC .. H04L 1/1812; H04L 5/0005; H04W 72/121; H04W 72/21; H04W 72/04
See application file for complete search history.

(56) References Cited

U.S. PATENT DOCUMENTS

2012/0106407 A1* 5/2012 Papasakellariou .. H04W 52/325
                                                                370/280
2015/0139174 A1   5/2015 Han
(Continued)

FOREIGN PATENT DOCUMENTS

CN   101499887 A   8/2009
CN   102413505 A   4/2012
(Continued)

OTHER PUBLICATIONS

First Office Action of Chinses patent application No. CN201911090976.1 dated Jan. 24, 2022.
(Continued)

*Primary Examiner* — Abdelnabi O Musa

(57) ABSTRACT

The present disclosure provides a method and device in nodes used for wireless communications. A first node receives a first signaling group, receives a first signal group, receives a second signaling group, transmits a second signal group, transmits a first bit block set in a first radio resource group. The first signaling group is used to indicate scheduling information of the first signal group, the second signaling group is used to indicate scheduling information of the second signal group, a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

20 Claims, 7 Drawing Sheets

(56) References Cited

U.S. PATENT DOCUMENTS

| | | | | |
|---|---|---|---|---|
| 2020/0404626 | A1* | 12/2020 | Wu | H04W 74/0808 |
| 2021/0091899 | A1* | 3/2021 | Wu | H04L 5/1469 |
| 2021/0359792 | A1* | 11/2021 | Wu | H04L 5/0094 |
| 2022/0159647 | A1* | 5/2022 | Jiang | H04W 28/26 |
| 2022/0200831 | A1* | 6/2022 | Wu | H04W 72/12 |
| 2022/0225287 | A1* | 7/2022 | Zhang | H04W 72/56 |
| 2022/0225361 | A1* | 7/2022 | Lee | H04W 72/1268 |
| 2022/0248436 | A1* | 8/2022 | Zhang | H04L 1/1854 |
| 2022/0264461 | A1* | 8/2022 | Chen | H04W 72/0446 |
| 2022/0294591 | A1* | 9/2022 | Liu | H04L 1/1864 |
| 2023/0023580 | A1* | 1/2023 | Wu | H04L 5/1469 |
| 2023/0039610 | A1* | 2/2023 | Wu | H04W 72/23 |
| 2023/0412327 | A1* | 12/2023 | Wu | H04L 5/1469 |

FOREIGN PATENT DOCUMENTS

| | | |
|---|---|---|
| CN | 103178942 A | 6/2013 |
| CN | 103929266 A | 7/2014 |
| CN | 104104466 A | 10/2014 |
| CN | 104429008 A | 3/2015 |
| CN | 110311762 A | 10/2019 |
| WO | 2016114700 A1 | 7/2016 |
| WO | 2019098893 A1 | 5/2019 |
| WO | 2019098896 A1 | 5/2019 |
| WO | 2019194711 A1 | 10/2019 |

OTHER PUBLICATIONS

ISR received in application No. PCT/CN2020/121351 dated Jan. 6, 2021.

First Search Report of Chinses patent application No. CN201911090976.1 dated Jan. 13, 2022.

Notification to Grant Patent Right for Invention of Chinses patent application No. CN201911090976.1 dated May 26, 2022.

Samsung CR to 38.213 capturing the RAN1#94 meeting agreements 3GPP TSG RAN WG1 Meeting #94 R1-1810020 Sep. 4, 2018.

Samsung CR to 38.213 capturing the RAN1#94bis and RAN1#95 meeting agreements 3GPP TSG RAN WG1 Meeting #95 R1-1814380 Nov. 28, 2018.

Huawei, HiSilicon Sidelink resource allocation mode 1 3GPP TSG RAN WG1 Meeting #98bis R1-1910055 Oct. 20, 2019.

Ericsson (Rapporteur) Introduction of SA 3GPP TSG-WG2 Meeting #102AH R2-1810388 Jun. 30, 2018.

Ericsson (Rapporteur) Corrections to EN-DC 3GPP TSG-WG2 Meeting #103 R2-1813445 Sep. 5, 2018.

* cited by examiner

First bit block set comprises only first bit block in first bit block and second bit block First bit block set comprises first bit block and second bit block First bit block set comprises only first bit block in first bit block and second bit block

METHOD AND DEVICE IN NODES USED FOR HARQ FEEDBACK IN WIRELESS COMMUNICATION

CROSS REFERENCE TO RELATED APPLICATIONS

This application is a continuation of the International patent application no. PCT/CN2020/121351, filed on Oct. 16, 2020, which claims the priority benefit of Chinese Patent Application no. 201911090976.1, filed on Nov. 9, 2019, the full disclosure of which is incorporated herein by reference.

BACKGROUND

Technical Field

The present disclosure relates to transmission methods and devices in wireless communication systems, and in particular to a transmission scheme and device of a sidelink in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The technical Study Item (SI) of NR V2X was approved at 3GPP RAN #80 Plenary. NR V2X has agreed Sidelink (SL) Hybrid Automatic Repeat request (HARQ) feedback and a transmission of an SL HARQ feedback on Physical Uplink Control Channel (PUCCH).

SUMMARY

How to transmit an SL HARQ feedback and a DL HARQ feedback on an uplink control channel is a key research direction.

To address the above problem, the present disclosure provides a solution. In description of the above problem, sidelink is illustrated as an example. The present disclosure is also applicable to other competition-based transmission scenarios, such as transmission on unlicensed spectrum, transmission based on configured grant, transmission based on scheduling grant, etc. And the present disclosure is also applicable to transmission scenarios of uplink and downlink, where similar technical effects in sidelink can be achieved. Additionally, the adoption of a unified solution for various scenarios (including but not limited to sidelink, other competition-based transmission, uplink and downlink) contributes to the reduction of hardcore complexity and costs. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling group;
  receiving a first signal group;
  receiving a second signaling group;
  transmitting a second signal group; and
  transmitting a first bit block set in a first radio resource group;
  herein, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one embodiment, a problem to be solved in the present disclosure is: How to transmit an SL HARQ feedback and a DL HARQ feedback on an uplink control channel.

In one embodiment, a problem to be solved in the present disclosure is: considering that an SL HARQ feedback and a DL HARQ feedback may be multiplexed on a same uplink control channel resource, how to determine a size of the DL HARQ codebook.

In one embodiment, a problem to be solved in the present disclosure is: considering that an SL HARQ feedback and a DL HARQ feedback may be multiplexed on a same uplink control channel resource, how to determine a size of the SL HARQ codebook.

In one embodiment, a problem to be solved in the present disclosure is: considering that an SL HARQ feedback and a DL HARQ feedback may be multiplexed on a same uplink control channel resource, how to determine a size of the DL HARQ codebook and a size of the SL HARQ codebook.

In one embodiment, the above method is essential in that whether HARQ codebooks on two links (such as SL and DL) are multiplexed on one PUCCH is used to determine a size of the HARQ codebook on one of the two links. The advantage of adopting the above method is that considering that partial signalings may be missed to be detected, and if the size of the HARQ codebook is dynamically determined by a signaling, the transmitting end and the receiving end may have inconsistent understanding on the size of the codebook. The proposed method can still ensure the consistency of the understanding of the transmitting end and the receiving end on the size of the codebook when a detection is missed, thus improving the transmission reliability.

In one embodiment, the above method is essential in that whether HARQ codebooks on two links (such as SL and DL) are multiplexed on one PUCCH is used to determine sizes of the HARQ codebooks on the two links. The advantage of adopting the above method is that considering that partial signalings may be missed to be detected, and if the sizes of the HARQ codebooks are dynamically determined by a signaling, the transmitting end and the receiving end may have inconsistent understanding on the sizes of the codebooks. The proposed method can still ensure the consistency of the understanding of the transmitting end and the receiving end on the size of the codebook when a detection is missed, thus improving the transmission reliability.

In one embodiment, the above method is essential in that a first signaling group is a group of DCI signaling(s) for scheduling of DL, a first signal group is a group of Physical Downlink Shared CHannels (PDSCHs), a second signaling group is a group of DCI signaling(s) for scheduling of SL, the second signal group is a group of Physical Sidelink Shared Channels (PSSCHs), a first radio resource group is a PUCCH, a first bit block set is Uplink Control Information (UCI), a first bit block is a DL HARQ codebook, and a second bit block is an SL HARQ codebook; whether the SL HARQ codebook and the DL HARQ codebook are multiplexed on a same PUCCH is used to determine a size of the DL HARQ codebook. The advantage of adopting the above method is that partial signalings may be missed to be detected, and if the size of the HARQ codebook is dynamically determined by a signaling, the transmitting end and the receiving end may have inconsistent understanding on the size of the codebook. The proposed method can still ensure the consistency of the understanding of the transmitting end and the receiving end on the size of the codebook when a detection is missed, thus improving the transmission reliability.

According to one aspect of the present disclosure, the above method is characterized in comprising:
  receiving a third signal group;
    herein, the third signal group is used to determine whether the second signal group is correctly received.

According to one aspect of the present disclosure, the above method is characterized in that the first bit block set comprises only the first bit block in the first bit block and the second bit block, a last signaling in the first signaling group is used to indicate the first radio resource group, and a last signaling in the first signaling group is used to determine the size of the first bit block.

According to one aspect of the present disclosure, the above method is characterized in comprising:
  transmitting a second bit block set in a second radio resource group;
  herein, the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

According to one aspect of the present disclosure, the above method is characterized in that the first bit block set comprises the first bit block and the second bit block, a last signaling in the first signaling group and the second signaling group is used to indicate the first radio resource group, and the size of the first bit block is equal to a first positive integer.

According to one aspect of the present disclosure, the above method is characterized in comprising:
  receiving second information;
  herein, the second information is used to determine the first positive integer.

According to one aspect of the present disclosure, the above method is characterized in comprising:
  receiving first information;
  herein, the first information is used to indicate N radio resource group sets, and any of the N radio resource group sets comprises at least one radio resource group, N being a positive integer is greater than 1; the first radio resource group is a radio resource group in a first radio resource group set, and the first radio resource group set is one of the N radio resource group sets.

The present disclosure provides a method in a second node for wireless communications, comprising:
  transmitting a first signaling group;
  transmitting a first signal group;
  transmitting a second signaling group; and
  receiving a first bit block set in a first radio resource group;
  herein, the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received.

According to one aspect of the present disclosure, the above method is characterized in that the first bit block set comprises only the first bit block in the first bit block and the second bit block, a last signaling in the first signaling group is used to indicate the first radio resource group, and a last signaling in the first signaling group is used to determine the size of the first bit block.

According to one aspect of the present disclosure, the above method is characterized in comprising:
  receiving a second bit block set in a second radio resource group;
  herein, the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

According to one aspect of the present disclosure, the above method is characterized in that the first bit block set comprises the first bit block and the second bit block, a last signaling in the first signaling group and the second signaling group is used to indicate the first radio resource group, and the size of the first bit block is equal to a first positive integer.

According to one aspect of the present disclosure, the above method is characterized in comprising:
  transmitting second information;
  herein, the second information is used to determine the first positive integer.

According to one aspect of the present disclosure, the above method is characterized in comprising:

transmitting first information;

herein, the first information is used to indicate N radio resource group sets, and any of the N radio resource group sets comprises at least one radio resource group, N being a positive integer is greater than 1; the first radio resource group is a radio resource group in a first radio resource group set, and the first radio resource group set is one of the N radio resource group sets.

The present disclosure provides a first node for wireless communications, comprising:

a first receiver, receiving a first signaling group; receiving a first signal group; receiving a second signaling group;

a first transmitter, transmitting a second signal group; transmitting a first bit block set in a first radio resource group;

herein, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

The present disclosure provides a second node for wireless communications, comprising:

a second transmitter, transmitting a first signaling group; transmitting a first signal group; transmitting a second signaling group;

a second receiver, receiving a first bit block set in a first radio resource group;

herein, the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one embodiment, the method in the present disclosure is advantageous in the following aspects:

the present disclosure proposes a scheme for transmitting an SL HARQ feedback and a DL HARQ feedback on an uplink control channel.

the present disclosure proposes a scheme for determining a size of the HARQ codebook when an SL HARQ feedback and a DL HARQ feedback may be multiplexed on a same uplink control channel resource.

in the method proposed in the present disclosure, the consistency of the understanding of transmitting end and the receiving end on the size of the codebook can still be guaranteed when the detection of partial signalings is missed, so as to improve the transmission reliability.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
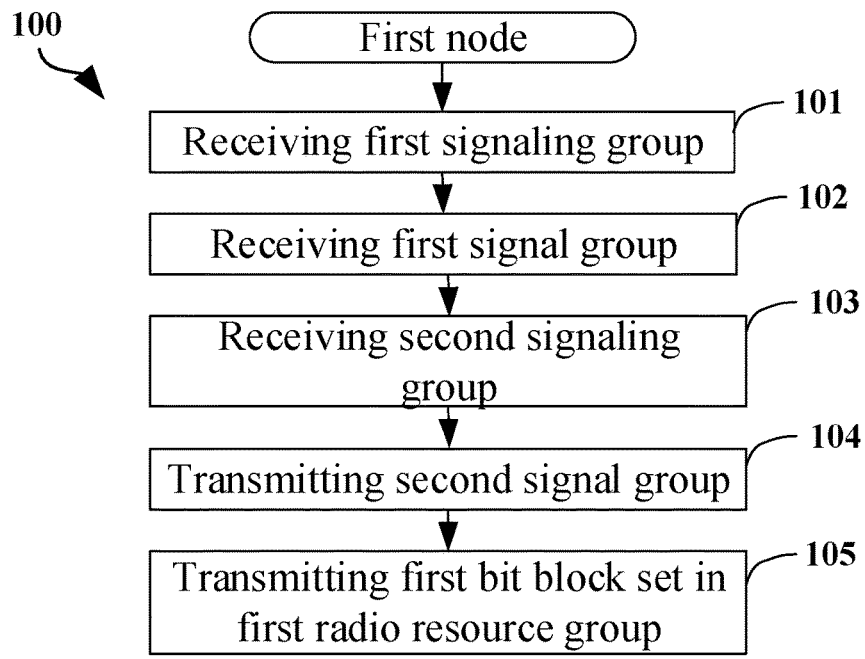
FIG. 1 illustrates a flowchart of a first signaling group, a first signal group, a second signaling group, a second signal group and a first bit block set according to one embodiment of the present disclosure.

Embodiment 1 illustrates a flowchart of a first signaling group, a first signal group, a second signaling group, a second signal group and a first bit block set according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives a first signaling group in step 101; receives a first signal group in step 102; receives a second signaling group in step 103; transmits a second signal group in step 104; and transmits a first bit block set in a first radio resource group in step 105; herein, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one embodiment, any signaling in the first signaling group is a physical layer signaling.

In one embodiment, any signaling in the first signaling group is dynamically configured.

In one embodiment, any signaling in the first signaling group is a Downlink Control Information (DCI) signaling.

In one embodiment, any signaling in the first signaling group is used to schedule DL transmission.

In one embodiment, any signaling in the first signaling group is a DL grant DCI signaling.

In one embodiment, the first signaling group is transmitted through a downlink physical layer control channel.

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the first signaling group is transmitted through a radio interface between a UE and a base station.

In one embodiment, the first signaling group is transmitted through a Uu interface.

In one embodiment, a transmitter of the first signaling group is a serving cell of the first node.

In one embodiment, any signal in the first signal group carries data.

In one embodiment, any signal in the first signal group carries a Transport Block (TB).

In one embodiment, the first signal group is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, a number of signalings comprised in the first signaling group is the same as a number of signals comprised in the first signal group.

In one embodiment, a number of signalings comprised in the first signaling group is not greater than a number of signals comprised in the first signal group.

In one embodiment, the first signaling group explicitly indicates scheduling information of the first signal group.

In one embodiment, the first signaling group implicitly indicates scheduling information of the first signal group.

In one embodiment, the first signaling group comprises K1 first-type signaling(s), the first signal group comprises K1 first-type signal(s), and the K1 first-type signaling(s) is (are respectively) used to indicate scheduling information of the K1 first-type signal(s), K1 being a positive integer.

In one subembodiment of the above embodiment, the K1 first-type signaling(s) explicitly indicates (and respectively indicate) scheduling information of the K1 first-type signal(s).

In one subembodiment of the above embodiment, the K1 first-type signaling(s) implicitly indicates (and respectively indicate) scheduling information of the K1 first-type signal(s).

In one embodiment, a first given signal is any signal in the first signal group, and scheduling information of the first given signal comprises occupied time-domain resources, occupied frequency-domain resources, a HARQ process number and a Downlink Assignment Index (DAI).

In one embodiment, a first given signal is any signal in the first signal group, and scheduling information of the first given signal comprises at least one of occupied time-domain resources, occupied frequency-domain resources, a Modulation and Coding Scheme (MCS), configuration information of DeModulation Reference Signals (DMRS), a HARQ process number, a Redundancy Version (RV), a New Data Indicator (NDI), a Downlink Assignment Index (DAI), a transmitting antenna port, a corresponding multi-antenna related transmission or a corresponding multi-antenna related reception.

In one embodiment, configuration information of the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, any signaling in the second signaling group is a physical layer signaling.

In one embodiment, any signaling in the second signaling group is dynamically configured.

In one embodiment, any signaling in the second signaling group is a DCI signaling.

In one embodiment, any signaling in the second signaling group is used to schedule SL transmission.

In one embodiment, any signaling in the second signaling group is a sidelink grant DCI signaling.

In one embodiment, the second signaling group is transmitted through a downlink physical layer control channel.

In one embodiment, the second signaling group is transmitted through a radio interface between a UE and a base station.

In one embodiment, the second signaling group is transmitted through a Uu interface.

In one embodiment, a transmitter of the second signaling group is a serving cell of the first node.

In one embodiment, any signal in the second signal group carries data.

In one embodiment, any signal in the second signal group carries a Transport Block (1B).

In one embodiment, the second signal group is transmitted on a sidelink data channel.

In one embodiment, the sidelink data channel is a Sidelink Shared CHannel (SL-SCH).

In one embodiment, the sidelink data channel is a Physical Sidelink Shared Channel (PSSCH).

In one embodiment, the second signal group is transmitted through a radio interface between UEs.

In one embodiment, the second signal group is transmitted through a radio interface of sidelink.

In one embodiment, the second signal group is transmitted through a PC5 interface.

In one embodiment, a number of signalings comprised in the second signaling group is the same as a number of signals comprised in the second signal group.

In one embodiment, a number of signalings comprised in the second signaling group is not greater than a number of signals comprised in the second signal group.

In one embodiment, the second signaling group explicitly indicates scheduling information of the second signal group.

In one embodiment, the second signaling group implicitly indicates scheduling information of the second signal group.

In one embodiment, the second signaling group comprises K2 second-type signaling(s), the second signal group comprises K2 second-type signal(s), and the K2 second-type signaling(s) is (are respectively) used to indicate scheduling information of the K2 second-type signal(s), K2 being a positive integer.

In one subembodiment of the above embodiment, the K2 second-type signaling(s) explicitly indicates (and respectively indicate) scheduling information of the K2 second-type signal(s).

In one subembodiment of the above embodiment, the K2 second-type signaling(s) implicitly indicates (and respectively indicate) scheduling information of the K2 second-type signal(s).

In one embodiment, a second given signal is any signal in the second signal group, and scheduling information of the second given signal comprises occupied time-domain resources, a HARQ process number and a Downlink Assignment Index (DAT).

In one embodiment, a second given signal is any signal in the second signal group, and scheduling information of the second given signal comprises occupied time-domain resources, occupied frequency-domain resources, a HARQ process number and a Downlink Assignment Index (DAT).

In one embodiment, a second given signal is any signal in the second signal group, and scheduling information of the second given signal comprises at least one of occupied time-domain resources, occupied frequency-domain resources, an MCS, configuration information of DMRS, a HARQ process number, an RV, an NDI, a Downlink Assignment Index (DAT), a transmitting antenna port, its corresponding multi-antenna related transmission or its corresponding multi-antenna related reception.

In one embodiment, configuration information of the DMRS comprises at least one of an RS sequence, a mapping mode, a DMRS type, occupied time-domain resources, occupied frequency-domain resources, occupied code-domain resources, a cyclic shift, or an OCC.

In one embodiment, the first radio resource group comprises at least one of time-domain resources, frequency-domain resources or code-domain resources In one embodiment, the first radio resource group comprises time-domain resources and frequency-domain resources.

In one embodiment, the first radio resource group comprises time-domain resources, frequency-domain resources and code-domain resources.

In one embodiment, the first radio resource group comprises at least one multi-carrier symbol in time domain.

In one embodiment, the first radio resource group comprises at least one sub-carrier symbol in frequency domain.

In one embodiment, the first radio resource group comprises at least one Resource Block (RB) in frequency domain.

In one embodiment, the first radio resource group comprises at least one RE.

In one embodiment, the first radio resource group is used for uplink control channel transmission.

In one embodiment, the first radio resource group is used for a PUCCH transmission.

In one embodiment, the first bit block set comprises at least one bit block, and any bit block in the first bit block set comprises at least one bit.

In one embodiment, the first bit block comprises at least one bit, and the second bit block comprises at least one bit.

In one embodiment, the first bit block comprises a DL HARQ codebook, and the second bit block comprises an SL HARQ codebook.

In one embodiment, the first bit block comprises a DL HARQ bit, and the second bit block comprises an SL HARQ bit.

In one embodiment, a last signaling in the second signaling group is used to determine a size of the second bit block.

In one embodiment, a size of the second bit block is pre-configured.

In one embodiment, a size of the second bit block is configurable.

In one embodiment, at least one signaling in the first signaling group is used to indicate whether a second bit block is comprised in the first bit block set.

In one embodiment, at least one signaling in the second signaling group is used to indicate whether a second bit block is comprised in the first bit block set.

In one embodiment, at least one signaling in the first signaling group and the second signaling group is used to indicate whether a second bit block is comprised in the first bit block set.

In one embodiment, a last signaling in the first signaling group is used to indicate whether a second bit block is comprised in the first bit block set.

In one embodiment, a last signaling in the second signaling group is used to indicate whether a second bit block is comprised in the first bit block set.

In one embodiment, a last signaling in the first signaling group and the second signaling group is used to indicate whether a second bit block is comprised in the first bit block set.

In one embodiment, a last signaling in the first signaling group indicates a first time window, a last signaling in the second signaling group indicates a second time window, and whether the first time window is orthogonal to the second time window is used to determine whether a second bit block is comprised in the first bit block.

In one subembodiment of the above embodiment, the first time window and the second time window are orthogonal, and the first bit block set comprises only the first bit block in the first bit block and the second bit block.

In one subembodiment of the above embodiment, the first time window and the second time window are non-orthogonal, and the first bit block set comprises the first bit block and the second bit block.

In one subembodiment of the above embodiment, the first radio resource group belongs to the first time window in time domain.

In one subembodiment of the above embodiment, the second radio resource group belongs to the second time window in time domain.

In one embodiment, a last signaling in the first signaling group indicates a first time window, a last signaling in the second signaling indicates a second time window, and whether the first time window overlaps with the second time window is used to determine whether a second bit block is comprised in the first bit block.

In one subembodiment of the above embodiment, the first time window and the second time window are non-overlapped, and the first bit block set comprises only the first bit block in the first bit block and the second bit block.

In one subembodiment of the above embodiment, the first time window and the second time window are overlapped, and the first bit block set comprises the first bit block and the second bit block.

In one subembodiment of the above embodiment, the first radio resource group belongs to the first time window in time domain.

In one subembodiment of the above embodiment, the second radio resource group belongs to the second time window in time domain.

In one embodiment, a last signaling in the first signaling group indicates a first time window, a last signaling in the second signaling indicates a second time window, and whether the first time window and the second time window are the same is used to determine whether a second bit block is comprised in the first bit block.

In one subembodiment of the above embodiment, the first time window and the second time window are different, and the first bit block set comprises only the first bit block in the first bit block and the second bit block.

In one subembodiment of the above embodiment, the first time window and the second time window are the same, and the first bit block set comprises the first bit block and the second bit block.

In one subembodiment of the above embodiment, the first radio resource group belongs to the first time window in time domain.

In one subembodiment of the above embodiment, the second radio resource group belongs to the second time window in time domain.

In one embodiment, the first time window comprises at least one consecutive multi-carrier symbol.

In one embodiment, the first time window comprises a slot.

In one embodiment, the first time window comprises a subframe.

In one embodiment, the first time window comprises a mini-slot.

In one embodiment, the second time window comprises at least one consecutive multi-carrier symbol.

In one embodiment, the second time window comprises a slot.

In one embodiment, the second time window comprises a subframe.

In one embodiment, the second time window comprises a mini-slot.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multi-carrier symbol is a Filter Bank Multi-Carrier (FBMC) symbol.

In one embodiment, the multicarrier symbol comprises a Cyclic Prefix (CP).

In one embodiment, the meaning of "the first bit block being related to whether the first signal group is correctly received" includes: a HARQ codebook for the first signal group is used to generate the first bit block.

In one embodiment, the meaning of "the first bit block being related to whether the first signal group is correctly received" includes: the first bit block comprises partial or all bits in a HARQ codebook for the first signal group.

In one embodiment, the meaning of "the first bit block being related to whether the first signal group is correctly received" includes: the first bit block is used to indicate whether part or all of the first signal group is correctly received.

In one embodiment, the meaning of "the first bit block being related to whether the first signal group is correctly received" includes: the first bit block is used to indicate whether at least one signal in the first signal group is correctly received.

In one embodiment, the first bit block is unrelated to whether the second signal group is correctly received.

In one embodiment, a value of the first bit block is unrelated to whether the second signal group is correctly received.

In one embodiment, the meaning of "the second bit block being related to whether the second signal group is correctly received" includes: a HARQ codebook for the second signal group is used to generate the second bit block.

In one embodiment, the meaning of "the second bit block being related to whether the second signal group is correctly received" includes: the second bit block comprises partial or all bits in a HARQ codebook for the second signal group.

In one embodiment, the meaning of "the second bit block being related to whether the second signal group is correctly received" includes: the second bit block is used to indicate whether partial or all signals of the second signal group is correctly received.

In one embodiment, the meaning of "the second bit block being related to whether the second signal group is correctly received" includes: the second bit block is used to indicate whether at least one signal in the second signal group is correctly received.

In one embodiment, the second bit block is unrelated to whether the first signal group is correctly received.

In one embodiment, a value of the second bit block is unrelated to whether the first signal group is correctly received.

In one embodiment, a size of a given bit block is a number of bits comprised in the given bit block.

In one embodiment, a size of a given bit block is a positive integer.

Embodiment 2

Figure 2:
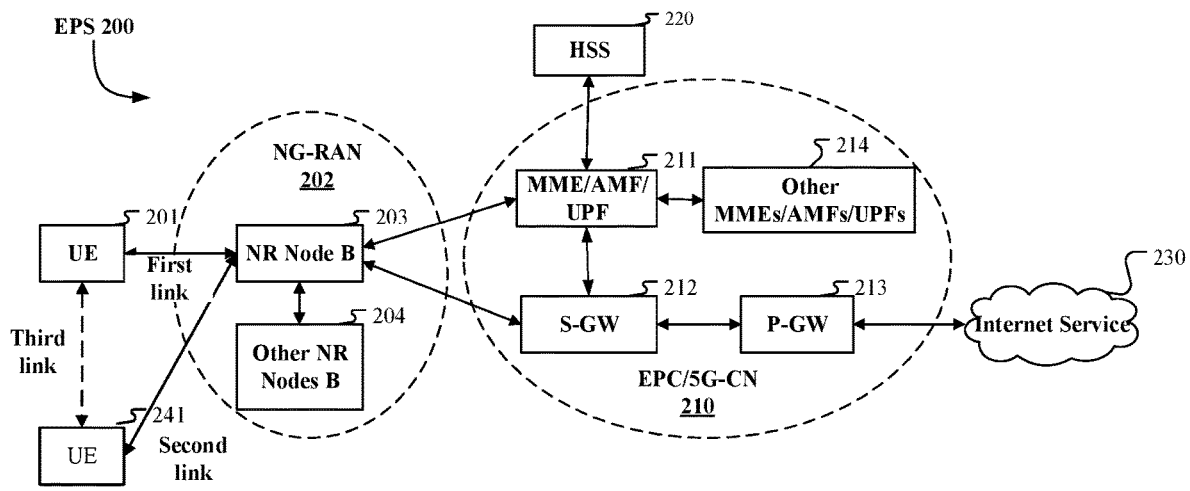
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

In one embodiment, the UE 241 corresponds to the third node in the present disclosure.

Embodiment 3

Figure 3:
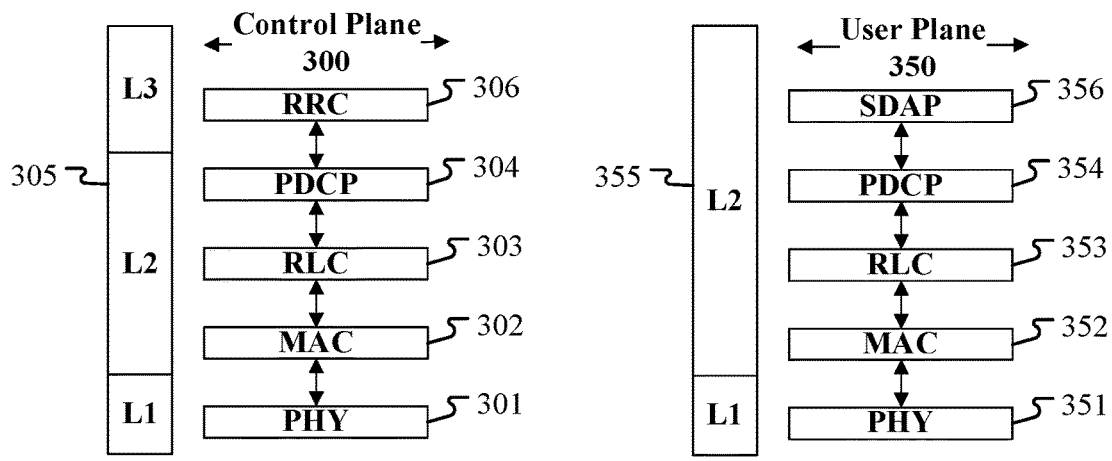
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the MAC sublayer 352.

In one embodiment, the first information in the present disclosure is generated by the PHY 301.

In one embodiment, the first information in the present disclosure is generated by the PHY 351.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the MAC sublayer 352.

In one embodiment, the second information in the present disclosure is generated by the PHY 301.

In one embodiment, the second information in the present disclosure is generated by the PHY 351.

In one embodiment, the first signaling group in the present disclosure is generated by the PHY 301.

In one embodiment, the first signaling group in the present disclosure is generated by the PHY 351.

In one embodiment, the first signal group in the present disclosure is generated by the PHY 301.

In one embodiment, the first signal group in the present disclosure is generated by the PHY 351.

In one embodiment, the second signaling group in the present disclosure is generated by the PHY 301.

In one embodiment, the second signaling group in the present disclosure is generated by the PHY 351.

In one embodiment, the second signal group in the present disclosure is generated by the PHY 301.

In one embodiment, the second signal group in the present disclosure is generated by the PHY 351.

In one embodiment, the third signal group in the present disclosure is generated by the PHY 301.

In one embodiment, the third signal group in the present disclosure is generated by the PHY 351.

In one embodiment, the first bit block set in the present disclosure is generated by the PHY 301.

In one embodiment, the first bit block set in the present disclosure is generated by the PHY 351.

In one embodiment, the second bit block set in the present disclosure is generated by the PHY 301.

In one embodiment, the second bit block set in the present disclosure is generated by the PHY 351.

Embodiment 4

Figure 4:
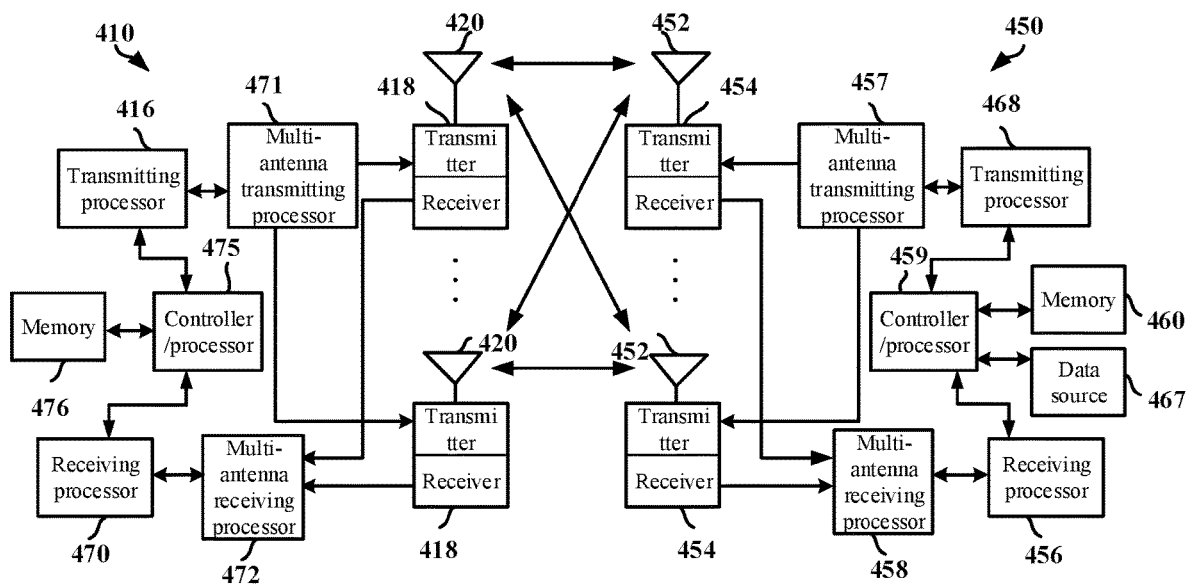
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the third node in the present disclosure comprises the first communication device 410.

In one subembodiment of the above embodiment, the first node is a UE, and the second node is a UE, and the third node is a base station.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling group; receives a first signal group; receives a second signaling group; transmits a second signal group; and transmits a first bit block set in a first radio resource group; herein, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first signaling group; receiving a first signal group; receiving a second signaling group; transmitting a second signal group; and transmitting a first bit block set in a first radio resource group; herein, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling group; transmits a first signal group; transmits a second signaling group; and receives a first bit block set in a first radio resource group; herein, the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block set comprises a second bit block, and the second bit block is related to whether the second signal group is correctly received.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first signaling group; transmitting a first signal group; transmitting a second signaling group; and receiving a first bit block set in a first radio resource group; herein, the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, at least one of the antenna 420, the transmitter 418, the multi-antenna transmitting processor 471, the transmitting processor 416, the controller/processor 475, or the memory 476 is used to transmit the first information in the present disclosure.

In one embodiment, at least one of the antenna 452, the receiver 454, the multi-antenna receiving processor 458, the receiving processor 456, the controller/processor 459, the memory 460, or the data source 467 is used to receive the second information in the present disclosure.

In one embodiment, at least one of the antenna 420, the transmitter 418, the multi-antenna transmitting processor 471, the transmitting processor 416, the controller/processor 475, or the memory 476 is used to transmit the second information in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling group in the present disclosure.

In one embodiment, at least one of the antenna 420, the transmitter 418, the multi-antenna transmitting processor 471, the transmitting processor 416, the controller/processor 475, or the memory 476 is used to transmit the first signaling group in the present disclosure.

In one embodiment, at least one of the antenna 452, the receiver 454, the multi-antenna receiving processor 458, the receiving processor 456, the controller/processor 459, the memory 460, or the data source 467 is used to receive the first signal group in the present disclosure.

In one embodiment, at least one of the antenna 420, the transmitter 418, the multi-antenna transmitting processor 471, the transmitting processor 416, the controller/processor 475, or the memory 476 is used to transmit the first signal group in the present disclosure.

In one embodiment, at least one of the antenna 452, the receiver 454, the multi-antenna receiving processor 458, the receiving processor 456, the controller/processor 459, the memory 460, or the data source 467 is used to receive the second signaling group in the present disclosure.

In one embodiment, at least one of the antenna 420, the transmitter 418, the multi-antenna transmitting processor 471, the transmitting processor 416, the controller/processor 475, or the memory 476 is used to transmit the second signaling group in the present disclosure.

In one embodiment, at least one of the antenna 452, the receiver 454, the multi-antenna receiving processor 458, the receiving processor 456, the controller/processor 459, the memory 460, or the data source 467 is used to receive the third signal group in the present disclosure.

In one embodiment, at least one of the antenna 420, the transmitter 418, the multi-antenna transmitting processor 471, the transmitting processor 416, the controller/processor 475, or the memory 476 is used to transmit the third signal group in the present disclosure.

In one embodiment, at least one of the antenna 452, the transmitter 454, the multi-antenna transmitting processor 458, the transmitting processor 468, the controller/processor 459, the memory 460, or the data sources 467 is used to receive the second signal group in the present disclosure.

In one embodiment, at least one of the antenna 420, the receiver 418, the multi-antenna receiving processor 472, the receiving processor 470, the controller/processor 475, or the memory 476 is used to receive the second signal group in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first bit block set in the present disclosure in the first radio resource group in the present disclosure.

In one embodiment, at least one of the antenna 420, the receiver 418, the multi-antenna receiving processor 472, the receiving processor 470, the controller/processor 475, or the memory 476 is used to receive the first bit block set in the present disclosure in the first radio resource group in the present disclosure.

In one embodiment, at least one of the antenna 452, the transmitter 454, the multi-antenna transmission processor 458, the transmitting processor 468, the controller/processor 459, the memory 460, or the data source 467 is used to transmit the second bit block set in the present disclosure in the second radio resource group in the present disclosure.

In one embodiment, at least one of the antenna 420, the receiver 418, the multi-antenna receiving processor 472, the receiving processor 470, the controller/processor 475, or the memory 476 is used to receive the second bit block set in the present disclosure in the second radio resource group in the present disclosure.

Embodiment 5

Figure 5:
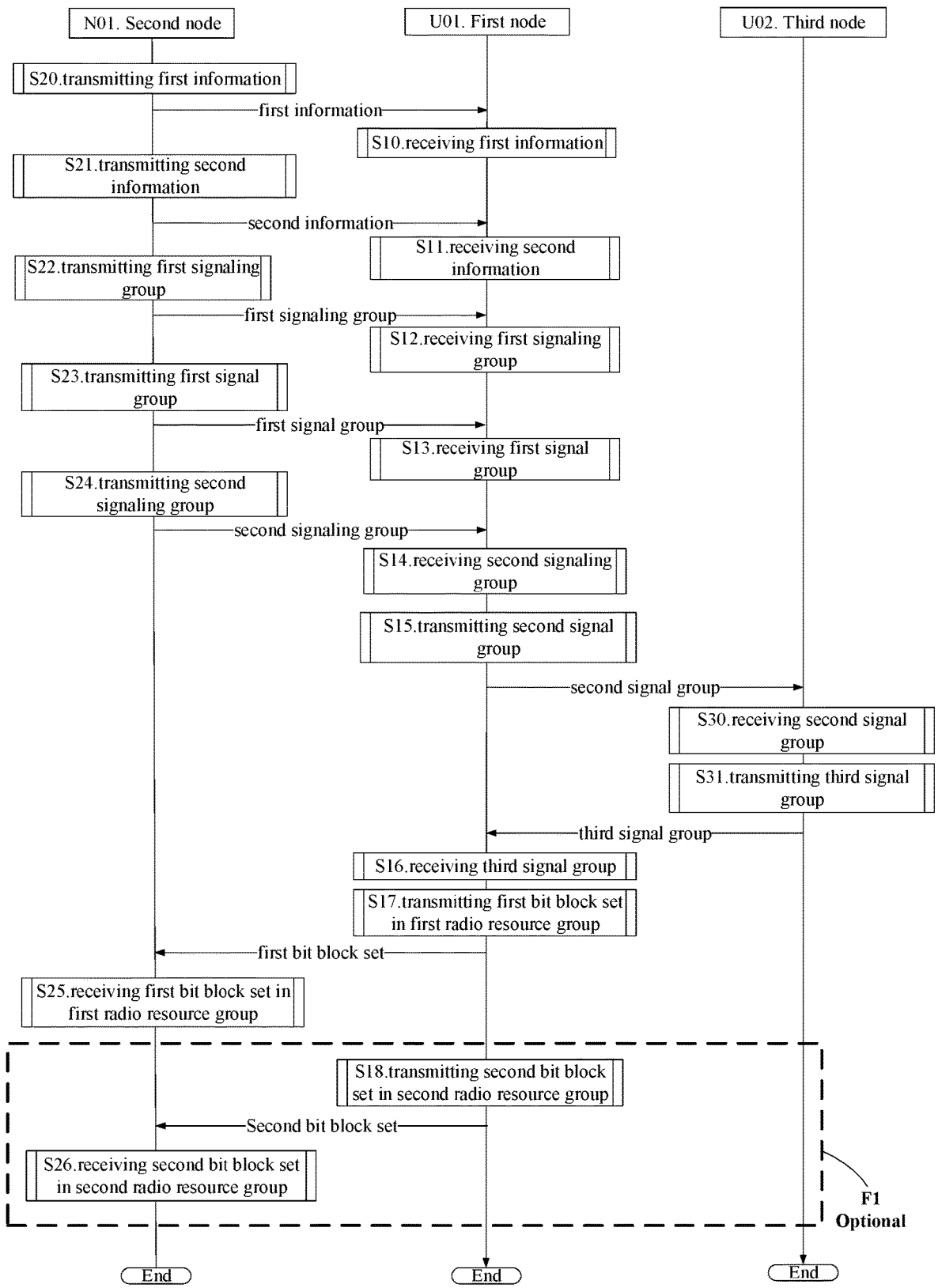
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5 a first node U01 and a second node N01 are in communications with each other via an air interface. In FIG. 5, steps in box F1 are optional.

The first node U01 receives first information in step S10; receives second information in step S11; receives a first signaling group in step S12; receives a first signal group in step S13; receives a second signaling group in step S14; transmits a second signal group in step S15; receives a third signal group in step S16; transmits a first bit block set in a first radio resource group in step S17; transmits a second bit block set in a second radio resource group in step S18;

the second node N01 transmits first information in step S20; transmits second information in step S21; transmits a first signaling group in step S22; transmits a first signal group in step S23; transmits a second signaling group in step S24; receives a first bit block set in a first radio resource group in step 25; receives a second bit block set in a second radio resource group in step S26;

the third node U02 receives a second signal group in step S30; transmits a third signal group in step S31.

In embodiment 5, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received; the third signal group is used by the first node U01 to determine whether the second signal group is correctly received; the second information is used by the first node U01 to determine the first positive integer; the first information is used to indicate N radio resource group sets, and any of the N radio resource group sets comprises at least one radio resource group, N being a positive integer is greater than 1; the first radio resource group is a radio resource group in a first radio resource group set, and the first radio resource group set is one of the N radio resource group sets.

In one embodiment, the first bit block set comprises only the first bit block in the first bit block and the second bit block, the dotted box F1 exists.

In one embodiment, the first bit block set comprises only the first bit block in the first bit block and the second bit block, the dotted box F1 do not exist.

In one embodiment, the first bit block set comprises the first bit block and the second bit block, the dotted box F1 does not exist.

In one embodiment, the dotted box F1 exists; the second bit block set comprises a third bit block, and the third bit block is used to indicate whether the second signal group is correctly received; a last signaling in the second signaling group is used to indicate the second radio resource group, and a last signaling in the second signaling group is used by the first node U01 to determine a size of the third bit block.

In one embodiment, a target receiver of the first signaling group is a target receiver of the second signaling group, a transmitter of the second signal group is a target receiver of the second signaling group, and a target receiver of the second signal group is different from the second node.

In one embodiment, a method in the first node also comprises:
  transmitting a third signaling group;
  herein, the third signaling group is used to indicate configuration information of the second signal group.

In one subembodiment of the above embodiment, the first transmitter also transmits a third signaling group; herein, the third signaling group is used to indicate configuration information of the second signal group.

In one subembodiment of the above embodiment, the third signaling group explicitly indicates configuration information of the second signal group.

In one subembodiment of the above embodiment, the third signaling group implicitly indicates configuration information of the second signal group.

In one embodiment, the third signaling group comprises K2 third-type signaling(s), the second signal group comprises K2 second-type signal(s), and the K2 third-type signaling(s) is (are respectively) used to indicate configuration information of the K2 second-type signal(s), K2 being a positive integer.

In one subembodiment of the above embodiment, the K2 third-type signaling(s) explicitly indicates (and respectively indicate) configuration information of the K2 second-type signal(s).

In one subembodiment of the above embodiment, the K2 third-type signaling(s) implicitly indicates (and respectively indicate) configuration information of the K2 second-type signal(s).

In one subembodiment of the above embodiment, time-frequency resources occupied by the K2 third-type signaling(s) are respectively associated with the K2 second-type signal(s).

In one embodiment, the configuration information of the second signal group comprises a priority, occupied frequency-domain resources, a destination identity (ID) and a source identity (ID).

In one embodiment, the configuration information of the second signal group comprises at least one of a priority, occupied frequency-domain resources, occupied time-domain resources, an MCS, resource reservation, a retransmission index, configuration information of DMRS, transmitting antenna ports, a transmitting power indication, a Destination ID, a Source ID, a HARQ process number, an NDI, or RV.

In one embodiment, the third signaling group is transmitted on a sidelink control channel.

In one embodiment, the sidelink control channel is a Sidelink Control CHannel (SL-CCH).

In one embodiment, the sidelink control channel is a Physical Sidelink Control CHannel (PSCCH).

In one embodiment, any signaling in the third signaling group is a physical layer signaling.

In one embodiment, any signaling in the third signaling group is groupcast or unicast.

In one embodiment, the third signaling group is transmitted on sidelink.

In one embodiment, any signaling in the third signaling group comprises an SCI signaling.

In one embodiment, any signaling in the third signaling group carries an SCI.

In one embodiment, the third signaling group is transmitted through a radio interface between UEs.

In one embodiment, the third signaling group is transmitted through a radio interface of sidelink.

In one embodiment, the third signaling is transmitted through a PC5 interface.

In one embodiment, a number of signalings comprised in the third signaling group is the same as a number of signals comprised in the second signal group.

In one embodiment, a number of signalings comprised in the third signaling group is not greater than a number of signals comprised in the second signal group.

In one embodiment, a last signaling in a given signaling group is a last received signaling in the given signaling group.

In one embodiment, a last signaling in a given signaling group is a signaling arranged in the end in the given signaling group.

In one subembodiment of the above embodiment, an arrangement rule of signalings in the given signaling group comprises a chronologically ascending order in time domain.

In one subembodiment of the above embodiment, an arrangement rule of signalings in the given signaling group comprises first frequency domain and then time domain.

In one subembodiment of the above embodiment, signalings in the given signaling group are arranged according to a chronologically ascending order in time domain.

In one subembodiment of the above embodiment, signalings in the given signaling group are arranged according to an order of first frequency domain and then time domain.

In one subembodiment of the above embodiment, signalings in the given signaling group are arranged according to an ascending order in frequency domain first, and a chronologically ascending order in time domain.

In one subembodiment of the above embodiment, signalings in the given signaling group are arranged according to a descending order in frequency domain, and a chronologically ascending order in time domain.

In one subembodiment of the above embodiment, the given signaling group comprises the first signaling group and the second signaling group.

In one subembodiment of the above embodiment, the given signaling group comprises the first signaling group.

In one subembodiment of the above embodiment, the given signaling group comprises the second signaling group.

In one embodiment, the third signal group carries a HARQ bit for the second signal group.

In one embodiment, the third signal is used to indicate whether the second signal group is correctly received.

In one embodiment, the third signal explicitly indicates whether the second signal group is correctly received.

In one embodiment, the third signal group implicitly indicates whether the second signal group is correctly received.

In one embodiment, the second signal group comprises K2 second-type signal(s), the third signal group comprises K2 third-type signal(s), and the K2 third-type signal(s) is (are respectively) used to indicate whether the K2 second-type signal(s) is(are) correctly received, K2 being a positive integer.

In one subembodiment of the above embodiment, the K2 third-type signaling(s) explicitly indicates (and respectively indicate) whether the K2 second-type signal(s) is(are) correctly received.

In one subembodiment of the above embodiment, the K2 third-type signaling(s) implicitly indicates (indicate) whether the K2 second-type signal(s) is(are) correctly received respectively.

In one subembodiment of the above embodiment, the K2 third-type signal(s) carries (respectively carry) HARQ bit(s) for the K2 second-type signal(s).

In one embodiment, the third signal group is transmitted on a Physical Sidelink Feedback Channel (PSFCH).

In one embodiment, a method in the third node comprises:
  receiving a second signal group; and
  transmitting a third signal group;
  herein, the third signal group is used by the first node U01 to determine whether the second signal group is correctly received.

In one subembodiment of the above embodiment, time-frequency resources occupied by the third signal group are associated with time-frequency resources occupied by the second signal group.

In one subembodiment of the above embodiment, time-frequency resources occupied by the third signal group can be inferred from time-frequency resources occupied by the second signal group.

In one subembodiment of the above embodiment, time-frequency resources occupied by the second signal group implicitly indicate time-frequency resources occupied by the third signal group.

In one subembodiment of the above embodiment, the third node comprises:
  a third receiver, receiving a second signal group; and
  a third transmitter, transmitting a third signal group;
  herein, the third signal group is used by the first node U01 to determine whether the second signal group is correctly received.

In one embodiment, a method in the third node also comprises:
  receiving a third signaling group;
  herein, the third signaling group is used to indicate scheduling information of the second signal group.

In one subembodiment of the above embodiment, the third receiver also receives a third signaling group;
  herein, the third signaling group is used to indicate scheduling information of the second signal group.

In one embodiment, the second radio resource group comprises at least one of time-domain resources, frequency-domain resources or code-domain resources.

In one embodiment, the second radio resource group comprises time-domain resources and frequency-domain resources.

In one embodiment, the second radio resource group comprises time-domain resources, frequency-domain resources and code-domain resources.

In one embodiment, the second radio resource group comprises at least one multi-carrier symbol in time domain.

In one embodiment, the second radio resource group comprises at least one sub-carrier symbol in frequency domain.

In one embodiment, the second radio resource group comprises at least one RB in frequency domain.

In one embodiment, the second radio resource group comprises at least one RE.

In one embodiment, the second bit block set comprises at least one bit block, and any bit block in the second bit block set comprises at least one bit.

In one embodiment, the third bit block comprises at least one bit.

In one embodiment, the third bit block comprises an SL HARQ codebook.

In one embodiment, the third bit block comprises an SL HARQ bit.

In one embodiment, the third bit block comprises a HARQ codebook for the second signal group.

In one embodiment, the third bit block is used to indicate whether each signal in the second signal group is correctly received.

In one embodiment, the first bit block set comprises only the first bit block in the first bit block and the second bit block, and a last signaling in the second signaling group is used to indicate the second radio resource group.

In one subembodiment of the above embodiment, a last signaling in the second signaling group explicitly indicates the second radio resource group.

In one subembodiment of the above embodiment, a last signaling in the second signaling group implicitly indicates the second radio resource group.

In one subembodiment of the above embodiment, a last signaling in the second signaling group is used to indicate the second radio resource group out of the second radio resource group set, the second radio resource group set comprises at least one radio resource group, and the second radio resource group is a radio resource group in the second radio resource group set.

In one subembodiment of the above embodiment, a last signaling in the second signaling group is used to indicate an index of the second radio resource group in a second radio resource group set, the second radio resource group set comprises at least one radio resource group, and the second radio resource group is a radio resource group in the second radio resource group set.

In one embodiment, a second radio resource group set is one of the N radio resource group sets comprising the second radio resource group; and a size of the third bit block is used to determine the second radio resource group set out of the N radio resource group sets.

In one embodiment, a last signaling in the second signaling group comprises a first field, the field comprised in the last signaling in the second signaling group indicates a second parameter, the second parameter is a positive integer, and the second parameter is used by the first node U01 to determine a size of the third bit block.

In one subembodiment of the above embodiment, the size of the third bit block is a positive integral multiple of the second parameter.

In one subembodiment of the above embodiment, the size of the third bit block is the second parameter.

In one subembodiment of the above embodiment, the size of the third bit block is a product of the second parameter and a maximum number of Code Block Groups (CBGs).

In one subembodiment of the above embodiment, the second parameter is equal to a number of signalings comprised in the second signaling group.

In one subembodiment of the above embodiment, the second parameter is equal to a number of signals comprised in the second signal group.

In one subembodiment of the above embodiment, the second parameter is a total Downlink assignment index (DAT).

In one subembodiment of the above embodiment, the first field comprised in a last signaling in the second signaling group is a Downlink assignment index field.

In one embodiment, the first information is semi-statically configured.

In one embodiment, the first information is carried by a higher-layer signaling.

In one embodiment, the first information is carried by an RRC signaling.

In one embodiment, the first information is carried by a MAC CE signaling.

In one embodiment, the first information comprises all or part of an Information Element (IE) of an RRC signaling.

In one embodiment, the first information comprises a plurality of IEs in an RRC signaling.

In one embodiment, the first information comprises a PUCCH-Config IE, and the specific meaning of the PUCCH-Config IE can be found in 3GPP TS38.331, section 6.3.2.

In one embodiment, the first information and the second information belong to a same IE in an RRC signaling.

In one embodiment, the first information explicitly indicates the N radio resource group sets.

In one embodiment, the first information implicitly indicates the N radio resource group sets.

In one embodiment, the first information indicates configuration information of each radio resource group in the N radio resource group sets.

In one embodiment, any radio resource group in the N radio resource group sets comprises at least one of code-domain resources, frequency-domain resources or code-domain resources.

In one embodiment, any radio resource group in the N radio resource group sets comprises time-domain resources and frequency-domain resources.

In one embodiment, any radio resource group in the N radio resource group sets comprises time-domain resources, frequency-domain resources and code-domain resources.

In one embodiment, any radio resource group in the N radio resource group sets comprises at least one multicarrier symbol in time domain.

In one embodiment, any radio resource group in the N radio resource group sets comprises at least one subcarrier in frequency domain.

In one embodiment, any radio resource group in the N radio resource group sets comprises at least one RB in frequency domain.

In one embodiment, any radio resource group in the N radio resource group sets comprises at least one RE.

In one embodiment, configuration information of any radio resource group in the N radio resource group sets comprises at least one of occupied time-domain resources, occupied code-domain resources, occupied frequency-domain resources and corresponding antenna port group.

In one embodiment, configuration information of any radio resource group in the N radio resource group sets comprises at least one of an occupied stating multicarrier symbol, a number of occupied multicarrier symbols, a starting Physical Resource Block (PRB) before or without frequency-hopping, a starting PRB after frequency hopping, a number of occupied PRBs, frequency-hopping setting, a Cyclic Shift (CS), an OCC, a length of an OCC, a corresponding antenna port group or a maximum code rate.

In one embodiment, any radio resource group in the N radio resource group sets is reserved for (UCI transmission.

In one embodiment, each of the N radio resource group sets comprises time-frequency resources belonging to an uplink physical layer control channel (i.e., an uplink channel only capable of carrying a physical layer signaling).

In one embodiment, any of the N radio resource group sets is a PUCCH resource set, and the specific meaning of the PUCCH resource set can be found in 3GPP TS38.213, section 9.2.1.

In one embodiment, the N radio resource group sets respectively correspond to N value ranges.

In one subembodiment of the above embodiment, any of the N value ranges is a positive integer.

In one subembodiment of the above embodiment, any of the N value ranges is a positive real number.

In one subembodiment of the above embodiment, the first information is used to indicate the N value ranges.

In one subembodiment of the above embodiment, the first information explicitly indicates the N value ranges.

In one subembodiment of the above embodiment, the first information implicitly indicates the N value ranges.

In one subembodiment of the above embodiment, the N value ranges are respectively ranges of numbers of bits that can be transmitted in the N radio resource group sets.

In one subembodiment of the above embodiment, the N value ranges are respectively ranges of numbers of UCI bits that can be transmitted in the N radio resource group sets.

In one subembodiment of the above embodiment, a first radio resource group set is one of the N radio resource group sets comprising the first radio resource group, and a first value range is one of the N value ranges corresponding to the first radio resource group set; a number of bits comprised in the first bit block set belongs to a first value range.

In one subembodiment of the above embodiment, the first information is used to indicate M threshold(s), and the M threshold(s) is (are respectively) used by the first node U01 to determine the N value ranges, M being a positive integer.

Embodiment 6

Figure 6:
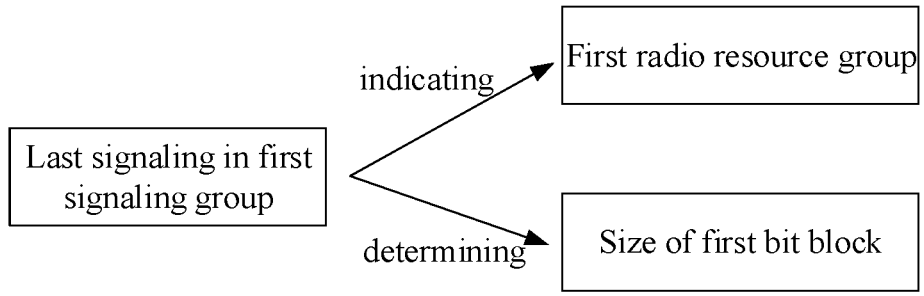
FIG. 6 illustrates a schematic diagram of a size of a first bit block according to one embodiment of the present disclosure.

Embodiment 6 illustrates a schematic diagram of determining a size of a first bit block according to one embodiment of the present disclosure, as shown in FIG. 6.

In embodiment 6, the first bit block set in the present disclosure comprises only the first bit block in the first bit block and the second bit block in the present disclosure, a last signaling in the first signaling group in the present disclosure is used to indicate the first radio resource group in the present disclosure, and a last signaling in the first signaling group is used to determine the size of the first bit block.

In one embodiment, the first bit block set comprises only the first bit block in the first bit block and the second bit block, and a last signaling in the first signaling group is used to indicate the first radio resource group.

In one subembodiment of the above embodiment, a last signaling in the first signaling group explicitly indicates the first radio resource group.

In one subembodiment of the above embodiment, a last signaling in the first signaling group implicitly indicates the first radio resource group.

In one subembodiment of the above embodiment, a last signaling in the first signaling group is used to indicate the first radio resource group out of a first radio resource group set, the first radio resource group set comprises at least one radio resource group, and the first radio resource group is a radio resource group in the first radio resource group set.

In one subembodiment of the above embodiment, a last signaling in the first signaling group is used to indicate an index of the first radio resource group in a first radio resource group set, the first radio resource group set comprises at least one radio resource group, and the first radio resource group is a radio resource group in the first radio resource group set.

In one embodiment, a last signaling in the first signaling group comprises a first field, the first field comprised in the last signaling in the first signaling group indicates a first parameter, the first parameter being a positive integer, and the first parameter is used to determine the size of the first bit block.

In one subembodiment of the above embodiment, the size of the first bit block is a positive integral multiple of the first parameter.

In one subembodiment of the above embodiment, the size of the first bit block is the first parameter.

In one subembodiment of the above embodiment, the size of the first bit block is a product of the first parameter and a maximum number of Code Block Groups (CBGs).

In one subembodiment of the above embodiment, the first parameter is equal to a number of signalings comprised in the first signaling group.

In one subembodiment of the above embodiment, the first parameter is equal to a number of signals comprised in the first signal group.

In one subembodiment of the above embodiment, the first parameter is a total Downlink assignment index (DAT).

In one subembodiment of the above embodiment, the first field comprised in a last signaling in the first signaling group is a Downlink assignment index field.

In one embodiment, the first bit block set comprises only the first bit block in the first bit block and the second bit block, a last signaling in the first signaling group is used to indicate the first radio resource group, and a last signaling in the first signaling group is used to determine the size of the first bit block.

In one embodiment, the first bit block set comprises only the first bit block in the first bit block and the second bit block, and the first bit block is used to indicate whether the first signal group is correctly received.

In one subembodiment of the above embodiment, the first bit block comprises a HARQ codebook for the first signal group.

In one subembodiment of the above embodiment, the first bit block is used to indicate whether each signal in the first signal group is correctly received.

Embodiment 7

Figure 7:
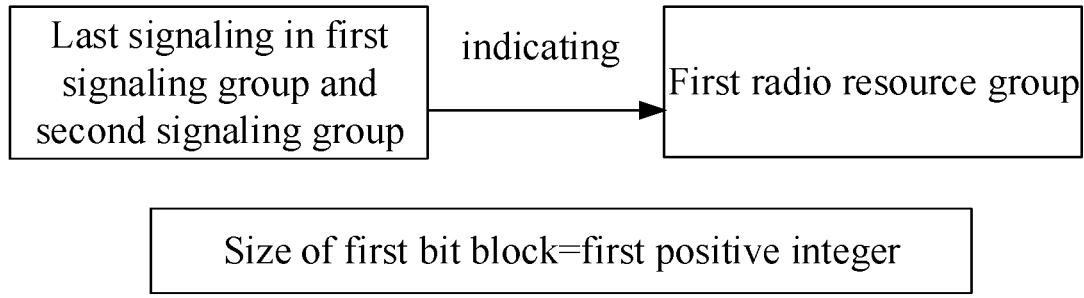
FIG. 7 illustrates a schematic diagram of a size of a first bit block according to another embodiment of the present disclosure.

Embodiment 7 illustrates a schematic diagram of a size of a first bit block according to another embodiment of the present disclosure, as shown in FIG. 7.

In embodiment 7, the first bit block in the present disclosure comprises the first bit block and the second bit block in the present disclosure, the first signaling group in the present disclosure and a last signaling in the second signaling group are used to indicate the first radio resource group in the present disclosure, and the size of the first bit block is equal to a first positive integer.

In one embodiment, the first positive integer is pre-configured.

In one embodiment, the first positive integer is configurable.

In one embodiment, the second information is used to determine the first positive integer.

In one embodiment, a last signaling in the first signaling group and the second signaling group is a last signaling in the first signaling group.

In one embodiment, a last signaling in the first signaling group and the second signaling group is a last signaling in the second signaling group.

In one embodiment, the first bit block set comprises the first bit block and the second bit block, and a last signaling in the first signaling group and the second signaling group is used to indicate the first radio resource group.

In one subembodiment of the above embodiment, a last signaling in the first signaling group and the second signaling group explicitly indicates the first radio resource group.

In one subembodiment of the above embodiment, a last signaling in the first signaling group and the second signaling group implicitly indicates the first radio resource group.

In one subembodiment of the above embodiment, a last signaling in the first signaling group and the second signaling group is used to indicate the first radio resource group out of the first radio resource group set, the first radio resource group set comprises at least one radio resource group, and the first radio resource group is a radio resource group in the first radio resource group set.

In one subembodiment of the above embodiment, a last signaling in the first signaling group and the second signaling group is used to indicate an index of the first radio resource group in a first radio resource group set, the first radio resource group set comprises at least one radio resource group, and the first radio resource group is a radio resource group in the first radio resource group set.

In one embodiment, the first bit block set comprises the first bit block and the second bit block, a fourth bit block is used to indicate whether the first signal group is correctly received, a last signaling in the first signaling group is used to determine the size of the fourth bit block, and the first positive integer and the fourth bit block are used together to determine the first bit block.

In one subembodiment of the above embodiment, the fourth bit block comprises a HARQ codebook for the first signal group.

In one subembodiment of the above embodiment, the fourth bit block is used to indicate whether each signal in the first signal group is correctly received.

In one subembodiment of the above embodiment, the first positive integer is equal to a size of the fourth bit block, and the first bit block is the same as the fourth bit block.

In one subembodiment of the above embodiment, the first positive integer is less than a size of the fourth bit block, and the fourth bit block comprises the first bit block.

In one subembodiment of the above embodiment, the first positive integer is greater than a size of the fourth bit block, and the first bit block comprises the fourth bit block.

In one subembodiment of the above embodiment, the first positive integer is greater than a size of the fourth bit block, the fourth bit block is obtained after the fourth bit block and at least one 0 bit are cascaded, and a number of the at least one 0 bit is equal to a size of the first bit block minus a size of the fourth bit block.

In one subembodiment of the above embodiment, the first positive integer is greater than a size of the fourth bit block, the fourth bit block is obtained after the fourth bit block and at least one 1 bit are cascaded, and a number of the at least one 1 bit is equal to a size of the first bit block minus a size of the fourth bit block.

In one embodiment, a last signaling in the first signaling group comprises a first field, the first field comprised in the last signaling in the first signaling group indicates a first parameter, the first parameter is a positive integer, and the first parameter is used to determine the size of the fourth bit block.

In one subembodiment of the above embodiment, the size of the fourth bit block is a positive integral multiple of the first parameter.

In one subembodiment of the above embodiment, the size of the fourth bit block is the first parameter.

In one subembodiment of the above embodiment, the size of the fourth bit block is a product of the first parameter and a maximum number of Code Block Groups (CBGs).

In one subembodiment of the above embodiment, the first parameter is equal to a number of signalings comprised in the first signaling group.

In one subembodiment of the above embodiment, the first parameter is equal to a number of signals comprised in the first signal group.

In one subembodiment of the above embodiment, the first parameter is a total Downlink assignment index (DAT).

In one subembodiment of the above embodiment, the first field comprised in a last signaling in the first signaling group is a Downlink assignment index field.

Embodiment 8

Figure 8:
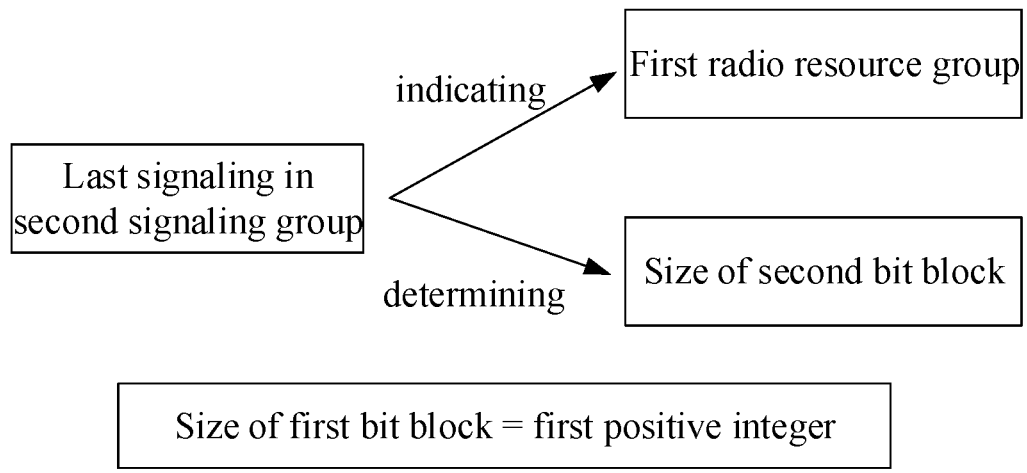
FIG. 8 illustrates a schematic diagram of a size of a second bit block according to one embodiment of the present disclosure.

Embodiment 8 illustrates a schematic diagram of a size of a second bit block according to one embodiment of the present disclosure, as shown in FIG. 8.

In embodiment 8, the first bit block set in the present disclosure comprises the first bit block and the second bit block in the present disclosure, a last signaling in the first signaling group and the second signaling group in the present disclosure is a last signaling in the second signaling group, and a last signaling in the second signaling group is used to indicate the first radio resource group in the present disclosure, the size of the first bit block is equal to a first positive integer, and a last signaling in the second signaling group is used to determine a size of the second bit block.

In one embodiment, a last signaling in the first signaling group and the second signaling group is a last signaling in the second signaling group, a last signaling in the second signaling group comprises a first field, the first field comprised in a last signaling in the second signaling group indicates a second parameter, the second parameter is a positive integer, and the second parameter is used to determine a size of the second bit block.

In one subembodiment of the above embodiment, the size of the second bit block is the same as the size of the third bit block.

In one subembodiment of the above embodiment, the size of the second bit block is a positive integral multiple of the second parameter.

In one subembodiment of the above embodiment, the size of the second bit block is the second parameter.

In one subembodiment of the above embodiment, the size of the second bit block is a product of the second parameter and a maximum number of Code Block Groups (CBGs).

In one subembodiment of the above embodiment, the second parameter is equal to a number of signalings comprised in the second signaling group.

In one subembodiment of the above embodiment, the second parameter is equal to a number of signals comprised in the second signal group.

In one subembodiment of the above embodiment, the second parameter is a total Downlink assignment index (DAT).

In one subembodiment of the above embodiment, the first field comprised in a last signaling in the second signaling group is a Downlink assignment index field.

In one embodiment, a last signaling in the second signaling group is used to determine a size of the second bit block.

Embodiment 9

Figure 9:
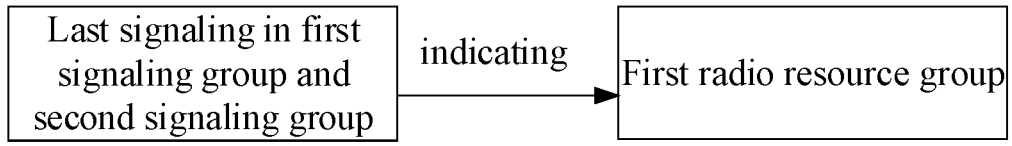
FIG. 9 illustrates a schematic diagram of a size of a second bit block according to another embodiment of the present disclosure.

Embodiment 9 illustrates a schematic diagram of a size of a second bit block according to another embodiment of the present disclosure, as shown in FIG. 9.

In embodiment 9, the first bit block set in the present disclosure comprises the first bit block and the second bit block in the present disclosure, a last signaling in the first signaling group and the second signaling group in the present disclosure is used to indicate the first radio resource group in the present disclosure, the size of the first bit block is equal to a first positive integer, and a size of the second bit block is equal to a second positive integer.

In one embodiment, the second positive integer is pre-configured.

In one embodiment, the second positive integer is configurable.

In one embodiment, the second information is used to determine the second positive integer.

In one embodiment, a third bit block is used to indicate whether the second signal group is correctly received, and a last signaling in the second signaling group is used to determine a size of the third bit block; a size of the second bit block is equal to a second positive integer, and the second positive integer and the third bit block are used together to determine the second bit block.

In one subembodiment of the above embodiment, the second positive integer is equal to a size of the third bit block, and the second bit block is the same as the third bit block.

In one subembodiment of the above embodiment, the second positive integer is less than a size of the third bit block, and the third bit block comprises the second bit block.

In one subembodiment of the above embodiment, the second positive integer is greater than a size of the third bit block, and the second bit block comprises the third bit block.

In one subembodiment of the above embodiment, the second positive integer is greater than a size of the third bit block, the second bit block is obtained after the third bit block and at least one 0 bit are cascaded, and a number of the at least one 0 bit is equal to a size of the second bit block minus a size of third bit block.

In one subembodiment of the above embodiment, the second positive integer is greater than a size of the third bit block, the second bit block is obtained after the third bit block and at least one 1 bit are cascaded, and a number of the at least one 1 bit is equal to a size of the second bit block minus a size of third bit block.

Embodiment 10

Figure 10:
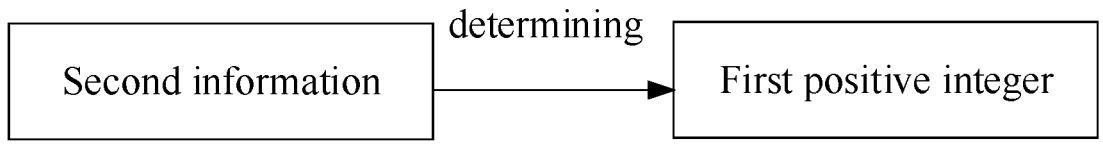
FIG. 10 illustrates a schematic diagram of a first positive integer according to one embodiment of the present disclosure.

Embodiment 10 illustrates a schematic diagram of a first positive integer according to one embodiment of the present disclosure, as shown in FIG. 10.

In embodiment 10, the second information in the present disclosure is used to determine the first positive integer.

In one embodiment, the second information is semi-statically configured.

In one embodiment, the second information is carried by a higher layer signaling.

In one embodiment, the second information is carried by an RRC signaling.

In one embodiment, the second information is carried by a MAC CE signaling.

In one embodiment, the second information comprises an Information Element (IE) in an RRC signaling.

In one embodiment, the second information comprises all or part of an IE in an RRC signaling.

In one embodiment, the second information comprises a plurality of IEs in an RRC signaling.

In one embodiment, the second information is used to indicate the first positive integer.

In one embodiment, the second information explicitly indicates the first positive integer.

In one embodiment, the second information implicitly indicates the first positive integer.

In one embodiment, a size of the second bit block is equal to a second positive integer, and the second information is used to determine the first positive integer and the second positive integer.

In one subembodiment of the above embodiment, the second information is used to indicate the first positive integer and the second positive integer.

In one subembodiment of the above embodiment, the second information explicitly indicates the first positive integer and the second positive integer.

In one subembodiment of the above embodiment, the second information implicitly indicates the first positive integer and the second positive integer.

In one embodiment, the first positive integer is a positive integer.

In one embodiment, the second positive integer is a positive integer.

Embodiment 11

Figure 11:
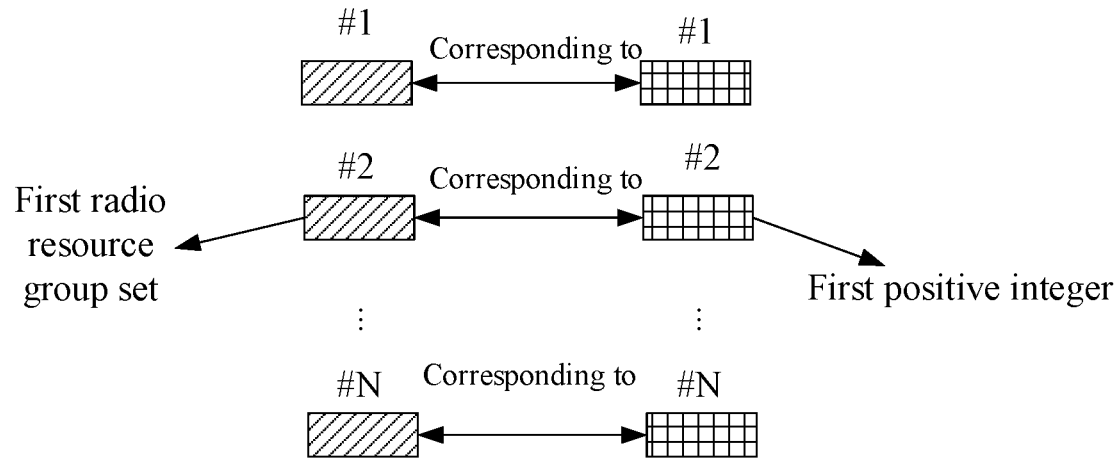
FIG. 11 illustrates a schematic diagram of a first positive integer according to another embodiment of the present disclosure.

Embodiment 11 illustrates a schematic diagram of a first positive integer according to another embodiment of the present disclosure, as shown in FIG. 11.

In embodiment 11, N first-type coefficients respectively correspond to the N radio resource group sets in the present disclosure, and the N first-type coefficients are all positive integers; the first positive integer is one of the N first-type coefficients corresponding to the first radio resource group set in the present disclosure.

In one embodiment, the N first-type coefficients are pre-configured.

In one embodiment, the N first-type coefficients are configurable.

In one embodiment, the second information is used to determine the N first-type coefficients.

In one embodiment, the second information is used to indicate the N first-type coefficients.

In one embodiment, the second information explicitly indicates the N first-type coefficients.

In one embodiment, the second information implicitly indicates the N first-type coefficients.

In one embodiment, N second-type coefficients respectively correspond to the N radio resource group sets, and N second-type coefficients are all positive integers; a size of the second bit block is a second positive integer, and the second positive integer is one of the N second-type coefficients corresponding to the first radio resource group set.

In one embodiment, the second information is used to determine the N first-type coefficients and the N second-type coefficients.

In one embodiment, the second information is used to indicate the N first-type coefficients and the N second-type coefficients.

In one embodiment, the second information explicitly indicates the N first-type coefficients and the N second-type coefficients.

In one embodiment, the second information implicitly indicates the N first-type coefficients and the N second-type coefficients.

In one embodiment, the N radio resource group sets respectively correspond to N value ranges, the N first-type coefficients respectively correspond to the N second-type coefficients, the N first-type coefficients and the N second-type coefficients are respectively added to obtain N positive integers, and the N positive integers respectively belong to the N value ranges.

In one subembodiment of the above embodiment, the N positive integers are respectively not greater than maximum values of the N value ranges.

In one subembodiment of the above embodiment, the N positive integers are respectively equal to maximum values of the N value ranges.

Embodiment 12

Figure 12:
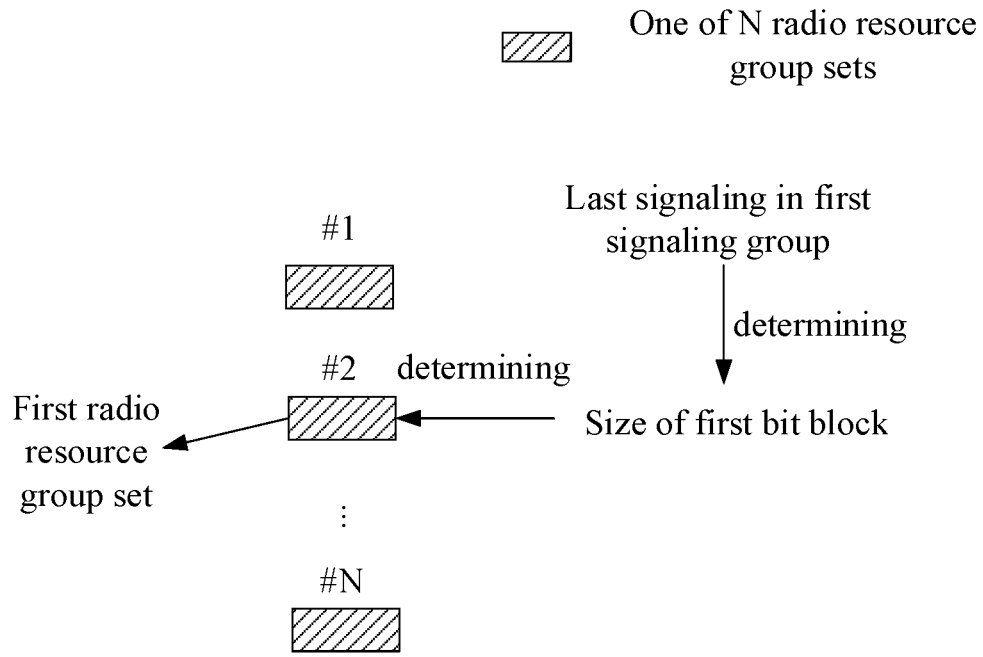
FIG. 12 illustrates a schematic diagram of determining a first radio resource group set according to one embodiment of the present disclosure.

Embodiment 12 illustrates a schematic diagram of determining a first radio resource group set according to one embodiment of the present disclosure, as shown in FIG. 12.

In embodiment 12, the first bit block set in the present disclosure comprises only the first bit block in the first bit block and the second bit block in the present disclosure, a last signaling in the first signaling group in the present disclosure is used to determine the size of the first bit block, and the size of the first bit block is used to determine the first radio resource group set out of the N radio resource group sets in the present disclosure.

In one embodiment, the N radio resource group sets respectively correspond to N value ranges; the size of the first bit block belongs to a first value range of the N value ranges, and the first radio resource group set is one of the N radio resource group sets corresponding to the first value range.

Embodiment 13

Figure 13:
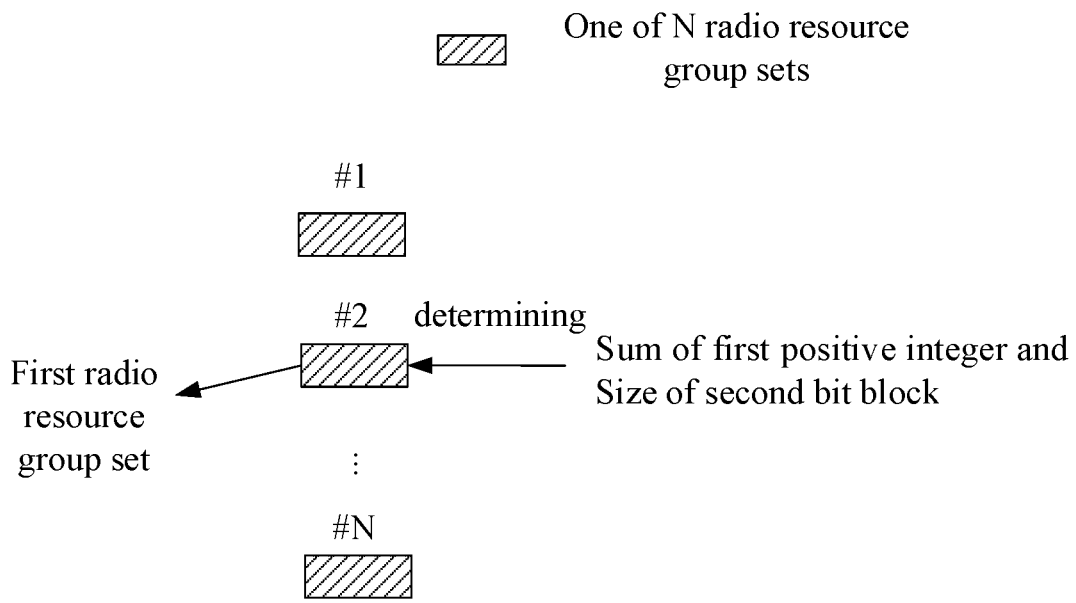
FIG. 13 illustrates a schematic diagram of determining a first radio resource group set according to another embodiment of the present disclosure.

Embodiment 13 illustrates a schematic diagram of determining a first radio resource group set according to another embodiment of the present disclosure, as shown in FIG. 13.

In embodiment 13, the first bit block set in the present disclosure comprises the first bit block and the second bit block in the present disclosure, and a sum of the first positive integer and a size of the second bit block is used to determine the first radio resource group set out of the N radio resource group sets in the present disclosure.

In one embodiment, the size of the second bit block is equal to the second positive integer.

In one embodiment, a last signaling in the second signaling group is used to determine the size of the second bit block.

In one embodiment, the N radio resource group sets respectively correspond to N value ranges; a sum of the first positive integer and the size of the second bit block belongs to a second value range of the N value ranges, and the first radio resource group set is one of the N radio resource group sets corresponding to the second value range.

Embodiment 14

Figure 14:
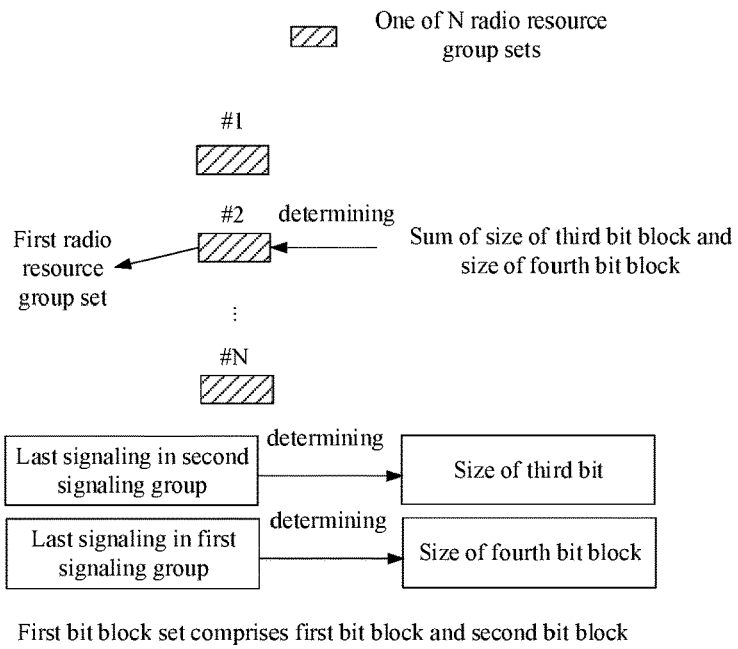
FIG. 14 illustrates a schematic diagram of determining a first radio resource group set according to another embodiment of the present disclosure.

Embodiment 14 illustrates a schematic diagram of determining a first radio resource group set according to another embodiment of the present disclosure, as shown in FIG. 14.

In Embodiment 14, the first bit block set in the present disclosure comprises the first bit block and the second bit block in the present disclosure; a third bit block is used to indicate whether the second signal group in the present disclosure is correctly received, and a last signaling in the second signaling group in the present disclosure is used to determine a size of the third bit block; a fourth bit block is used to indicate whether the first signal group in the present disclosure is correctly received, and a last signaling in the first signaling group in the present disclosure is used to determine a size of the fourth bit block; a sum of the size of the third bit block and the size of the fourth bit block is used to determine the first radio resource group set out of the N radio resource group sets in the present disclosure.

In one embodiment, the N radio resource group sets respectively correspond to N value ranges; a sum of the size of the third bit block and the size of the fourth bit block belongs to a third value range of the N value ranges, and the first radio resource group set is one of the N radio resource group sets corresponding to the third value range.

Embodiment 15

Figure 15:
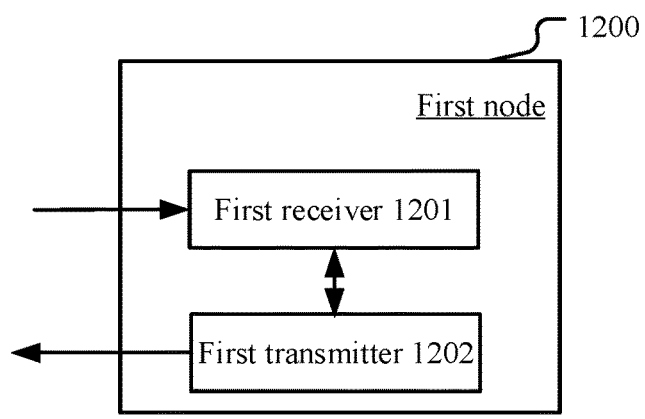
FIG. 15 illustrates a structure block diagram of a processing device in a first node according to one embodiment of the present disclosure.

Embodiment 15 illustrates a structure block diagram of a processing device in a first node, as shown in FIG. 15. In FIG. 15, a processing device 1200 of a first node comprises a first receiver 1201 and a first transmitter 1202.

In one embodiment, the first node 1200 is a UE.

In one embodiment, the first node 1200 is a relay node.

In one embodiment, the first node 1200 is a base station.

In one embodiment, the first node 1200 is a vehicle-mounted communication device.

In one embodiment, the first node 1200 is a UE that supports V2X communications.

In one embodiment, the first node 1200 is a relay node that supports V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 or the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first five the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first four the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first three the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first two the antenna 452, the transmitter 454, the multi-antenna transmitting processor 457, the transmitting processor 468, the controller/processor 459, the memory 460, or the data source 467 in FIG. 4 of the present disclosure.

The first receiver 1201 receives a first signaling group; receives a first signal group; and receives a second signaling group;
 the first transmitter 1202 transmits a second signal group; transmits a first bit block set in a first radio resource group;

In embodiment 15, the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received;
 a size of the first bit block is related to whether the first bit block set comprises a second bit block, and the second bit block is related to whether the second signal group is correctly received.

In one embodiment, the first receiver 1201 also receives a third signal group; herein, the third signal group is used to determine whether the second signal group is correctly received.

In one embodiment, the first bit block set comprises only the first bit block in the first bit block and the second bit block, a last signaling in the first signaling group is used to indicate the first radio resource group, and a last signaling in the first signaling group is used to determine the size of the first bit block.

In one embodiment, the first transmitter 1202 also transmits a second bit block set in a second radio resource group; herein, the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

In one embodiment, the first bit block set comprises the first bit block and the second bit block, a last signaling in the first signaling group and the second signaling group is used to indicate the first radio resource group, and the size of the first bit block is equal to a first positive integer.

In one embodiment, the first receiver 1201 also receives second information; herein, the second information is used to determine the first positive integer.

In one embodiment, the first receiver 1201 also receives first information; herein, the first information is used to indicate N radio resource group sets, and any of the N radio resource group sets comprises at least one radio resource group, N being a positive integer is greater than 1; the first radio resource group is a radio resource group in a first radio resource group set, and the first radio resource group set is one of the N radio resource group sets.

Embodiment 16

Figure 16:
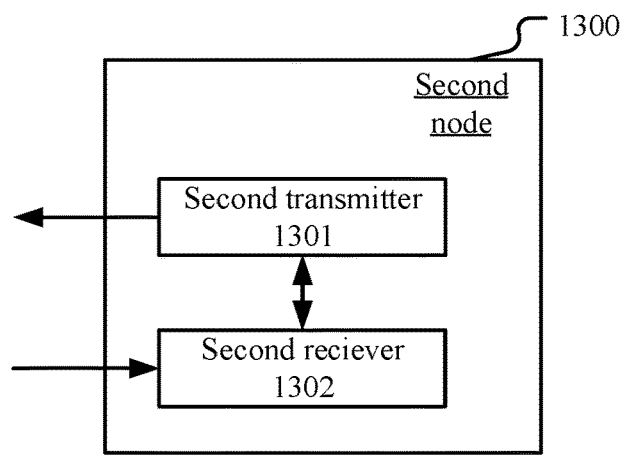
FIG. 16 illustrates a structure block diagram of a processing device in second node according to one embodiment of the present disclosure.

Embodiment 16 illustrates a structure block diagram of a processing device in a second node, as shown in FIG. 16. In FIG. 16, a processing device 1300 of a second node comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 or the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first five of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first four of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first three of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first two of the antenna 420, the receiver 418, the multi-antenna receiving processor 472, the receiving processor 470, the controller/processor 475 or the memory 476 in FIG. 4 of the present disclosure.

The second transmitter 1301 transmits a first signaling group; transmits a first signal group; transmits a second signaling group;

the second receiver 1302 receives a first bit block set in a first radio resource group;

in embodiment 16, the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received.

In one embodiment, the first bit block set comprises only the first bit block in the first bit block and the second bit block, a last signaling in the first signaling group is used to indicate the first radio resource group, and a last signaling in the first signaling group is used to determine the size of the first bit block.

In one embodiment, the second receiver 1302 also receives a second bit block set in a second radio resource group; herein, the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

In one embodiment, the first bit block set comprises the first bit block and the second bit block, a last signaling in the first signaling group and the second signaling group is used to indicate the first radio resource group, and the size of the first bit block is equal to a first positive integer.

In one embodiment, the second transmitter 1301 also transmits second information; herein, the second information is used to determine the first positive integer.

In one embodiment, the second transmitter 1301 also transmits first information; herein, the first information is used to indicate N radio resource group sets, and any of the N radio resource group sets comprises at least one radio resource group, N being a positive integer is greater than 1; the first radio resource group is a radio resource group in a first radio resource group set, and the first radio resource group set is one of the N radio resource group sets.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling group; receiving a first signal group; receiving a second signaling group; and
a first transmitter, transmitting a second signal group; transmitting a first bit block set in a first radio resource group;
wherein the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received; when the first bit block set comprises only the first bit block in the first bit block and the second bit block, a last signaling in the first signaling group is used to determine the size of the first bit block; when the first bit block set comprises the first bit block and the second bit block, the size of the first bit block is equal to a first positive integer, the first positive integer is pre-configured or the first positive integer is configurable.

2. The first node according to claim 1, wherein the first receiver also receives a third signal group; wherein the third signal group is used to determine whether the second signal group is correctly received;

or, the first receiver also receives first information; wherein the first information is used to indicate N radio resource group sets, and any of the N radio resource group sets comprises at least one radio resource group, N being a positive integer greater than 1; the first radio resource group is a radio resource group in a first radio resource group set, and the first radio resource group set is one of the N radio resource group sets.

3. The first node according to claim 1, wherein the first bit block set comprises only the first bit block in the first bit block and the second bit block, a last signaling in the first signaling group is used to indicate the first radio resource group, and the last signaling in the first signaling group comprises a first field, the first field comprised in the last signaling in the first signaling group is a Downlink assignment index field, the first field comprised in the last signaling in the first signaling group indicates a first parameter, the first parameter being a positive integer, and the first parameter is used to determine the size of the first bit block.

4. The first node according to claim 3, wherein the first transmitter also transmits a second bit block set in a second radio resource group; wherein the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

5. The first node according to claim 1, wherein the first bit block set comprises the first bit block and the second bit block, a last signaling in the first signaling group and the second signaling group is used to indicate the first radio resource group, and the size of the first bit block is equal to a first positive integer.

6. The first node according to claim 5, wherein the first receiver also receives second information; wherein the second information is used to determine the first positive integer.

7. A second node for wireless communications, comprising:

a second transmitter, transmitting a first signaling group; transmitting a first signal group;
transmitting a second signaling group; and
a second receiver, receiving a first bit block set in a first radio resource group;
wherein the first signaling group is used to indicate scheduling information of the first signal group, the second signaling group is used to indicate scheduling information of a second signal group, a target receiver of the first signaling group is a target receiver of the second signal group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received; when the first bit block set comprises only the first bit block in the first bit block and the second bit block, a last signaling in the first signaling group is used to determine the size of the first bit block; when the first bit block set comprises the first bit block and the second bit block, the size of the first bit block is equal to a first positive integer, the first positive integer is pre-configured or the first positive integer is configurable.

8. The second node according to claim 7, wherein the first bit block set comprises only the first bit block in the first bit block and the second bit block, a last signaling in the first signaling group is used to indicate the first radio resource group, and the last signaling in the first signaling group comprises a first field, the first field comprised in the last signaling in the first signaling group is a Downlink assignment index field, the first field comprised in the last signaling in the first signaling group indicates a first parameter, the first parameter being a positive integer, and the first parameter is used to determine the size of the first bit block.

9. The second node according to claim 8, wherein the second receiver also receives a second bit block set in a second radio resource group; wherein the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

10. The second node according to claim 7, wherein the first bit block set comprises the first bit block and the second bit block, a last signaling in the first signaling group and the second signaling group is used to indicate the first radio resource group, and the size of the first bit block is equal to a first positive integer.

11. The second node according to claim 10, wherein the second transmitter also transmits second information; wherein the second information is used to determine the first positive integer.

12. The second node according to claim 7, wherein the second transmitter also transmits first information; wherein the first information is used to indicate N radio resource group sets, and any of the N radio resource group sets comprises at least one radio resource group, N being a positive integer greater than 1; the first radio resource group is a radio resource group in a first radio resource group set, and the first radio resource group set is one of the N radio resource group sets.

13. A method in a first node for wireless communications, comprising:

receiving a first signaling group;
receiving a first signal group;
receiving a second signaling group;
transmitting a second signal group; and
transmitting a first bit block set in a first radio resource group;
wherein the first signaling group is used to indicate scheduling information of the first signal group, the second signaling group is used to indicate scheduling information of the second signal group, and a transmitter of the first signal group is different from a target receiver of the second signal group; the first bit block set comprises a first bit block, and the first bit block is related to whether the first signal group is correctly received; a size of the first bit block is related to whether the first bit block set comprises a second bit block, and the second bit block is related to whether the second signal group is correctly received; when the first bit block set comprises only the first bit block in the first bit block and the second bit block, a last signaling in the first signaling group is used to determine the size of the first bit block; when the first bit block set comprises the first bit block and the second bit block, the size of the first bit block is equal to a first positive integer, the first positive integer is pre-configured or the first positive integer is configurable.

14. The method in a first node according to claim 13, comprising:
receiving a third signal group;
wherein the third signal group is used to determine whether the second signal group is correctly received; or, receiving first information;
wherein the first information is used to indicate N radio resource group sets, and any of the N radio resource group sets comprises at least one radio resource group, N being a positive integer greater than 1; the first radio resource group is a radio resource group in a first radio resource group set, and the first radio resource group set is one of the N radio resource group sets.

15. The method in a first node according to claim 13, wherein the first bit block set comprises only the first bit block in the first bit block and the second bit block, a last signaling in the first signaling group is used to indicate the first radio resource group, and the last signaling in the first signaling group comprises a first field, the first field comprised in the last signaling in the first signaling group is a Downlink assignment index field, the first field comprised in the last signaling in the first signaling group indicates a first parameter, the first parameter being a positive integer, and the first parameter is used to determine the size of the first bit block.

16. The method in a first node according to claim 15, comprising:
transmitting a second bit block set in a second radio resource group;
wherein the second bit block set comprises a third bit block, and the third bit block is used to indicate whether the second signal group is correctly received; a last signaling in the second signaling group is used to indicate the second radio resource group, and a last signaling in the second signaling group is used to determine a size of the third bit block.

17. The method in a first node according to claim 13, wherein the first bit block set comprises the first bit block and the second bit block, a last signaling in the first signaling group and the second signaling group is used to indicate the first radio resource group, and the size of the first bit block is equal to a first positive integer.

18. The method in a first node according to claim 17, comprising:
receiving second information;
wherein the second information is used to determine the first positive integer.

19. A method in a second node for wireless communications, comprising:
transmitting a first signaling group;
transmitting a first signal group;
transmitting a second signaling group; and
receiving a first bit block set in a first radio resource group;
wherein the first signaling group is used to indicate scheduling information of the first signal group, the second signaling group is used to indicate scheduling information of a second signal group, a target receiver of the first signaling group is a target receiver of the second signaling group, a transmitter of the second signal group is a target receiver of the second signaling group, and a target receiver of the second signal group is different from the second node; the first bit block set comprises a first bit block, and the first bit block is related to whether the first signal group is correctly received; a size of the first bit block is related to whether the first bit block set comprises a second bit block, and the second bit block is related to whether the second signal group is correctly received; when the first bit block set comprises only the first bit block in the first bit block and the second bit block, a last signaling in the first signaling group is used to determine the size of the first bit block; when the first bit block set comprises the first bit block and the second bit block, the size of the first bit block is equal to a first positive integer, the first positive integer is pre-configured or the first positive integer is configurable.

20. The method in a second node according to claim 19, wherein the first bit block set comprises only the first bit block in the first bit block and the second bit block, a last signaling in the first signaling group is used to indicate the first radio resource group, and the last signaling in the first signaling group comprises a first field, the first field comprised in the last signaling in the first signaling group is a Downlink assignment index field, the first field comprised in the last signaling in the first signaling group indicates a first parameter, the first parameter being a positive integer, and the first parameter is used to determine the size of the first bit block;
or, the first bit block set comprises the first bit block and the second bit block, a last signaling in the first signaling group and the second signaling group is used to indicate the first radio resource group, and the size of the first bit block is equal to a first positive integer.

* * * * *